United States Patent
Nordbruch et al.

(10) Patent No.: US 10,019,899 B2
(45) Date of Patent: Jul. 10, 2018

(54) METHOD AND DEVICE FOR DETERMINING A PICKUP POSITION FROM MULTIPLE PICKUP POSITIONS FOR A VEHICLE INCORPORATED BY A PARKING FACILITY

(71) Applicant: Robert Bosch GmbH, Stuttgart (DE)

(72) Inventors: Stefan Nordbruch, Kornwestheim (DE); Thomas Nierhoff, Augsburg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/213,772

(22) Filed: Jul. 19, 2016

(65) Prior Publication Data

US 2017/0025004 A1    Jan. 26, 2017

(30) Foreign Application Priority Data

Jul. 24, 2015   (DE) .................. 10 2015 213 996

(51) Int. Cl.
*G08G 1/09*        (2006.01)
*G08G 1/01*        (2006.01)
(Continued)

(52) U.S. Cl.
CPC ........... *G08G 1/09* (2013.01); *G01C 21/3492* (2013.01); *G01C 21/362* (2013.01); *G05D 1/0027* (2013.01); *G05D 1/0276* (2013.01); *G06K 9/00771* (2013.01); *G08G 1/005* (2013.01); *G08G 1/0116* (2013.01); *G08G 1/0133* (2013.01); *G08G 1/0141* (2013.01); *G08G 1/0145* (2013.01); *G08G 1/04* (2013.01);
(Continued)

(58) Field of Classification Search
CPC .......... G08G 1/09; G08G 1/0141; G08G 1/04; G08G 1/0133; G08G 1/096816; G08G 1/09685; G08G 1/005; G08G 1/0116; G08G 1/205; G08G 1/0145; G06K 9/00771; H04L 67/00; H04W 4/02; H04W 4/046; G05D 1/0088; G05D 1/0276; G05D 1/0027; G05D 2201/0212; G01C 21/3492; G01C 21/362
USPC ......................................................... 701/118
See application file for complete search history.

(56) References Cited

U.S. PATENT DOCUMENTS

2010/0156672 A1   6/2010  Yoo et al.
2013/0231824 A1   9/2013  Wilson et al.
(Continued)

FOREIGN PATENT DOCUMENTS

DE    10 2011 084 124 A1    4/2013
DE         102012222562     6/2014
DE    10 2014 104 881 A1   10/2015

*Primary Examiner* — Brian P Sweeney
(74) *Attorney, Agent, or Firm* — Norton Rose Fulbright US LLP; Gerard Messina

(57) ABSTRACT

A method for determining a pickup position from multiple pickup positions for a vehicle incorporated by a parking facility, at which the vehicle is to be picked up after an automatic parking operation, including ascertaining a traffic situation inside and/or outside the parking facility, and determining the pickup position from the multiple pickup positions, based on the ascertained traffic situation, so that the automatic parking operation may end at the designated pickup position. A corresponding device, a corresponding parking facility, and a corresponding computer program are also described.

12 Claims, 2 Drawing Sheets

(51) Int. Cl.
*G01C 21/36* (2006.01)
*G01C 21/34* (2006.01)
*G05D 1/00* (2006.01)
*G05D 1/02* (2006.01)
*G08G 1/005* (2006.01)
*G08G 1/04* (2006.01)
*G08G 1/0968* (2006.01)
*G08G 1/00* (2006.01)
*G06K 9/00* (2006.01)
*H04W 4/04* (2009.01)

(52) U.S. Cl.
CPC ... *G08G 1/09685* (2013.01); *G08G 1/096816* (2013.01); *G08G 1/205* (2013.01); *H04W 4/046* (2013.01); *G05D 2201/0212* (2013.01)

(56) References Cited

U.S. PATENT DOCUMENTS

2014/0294543 A1* 10/2014 Jarvinen .................. E04H 6/12
　　　　　　　　　　　　　　　　　　　　　　　414/227
2015/0285645 A1　10/2015 Maise et al.

* cited by examiner

METHOD AND DEVICE FOR DETERMINING A PICKUP POSITION FROM MULTIPLE PICKUP POSITIONS FOR A VEHICLE INCORPORATED BY A PARKING FACILITY

CROSS REFERENCE

The present application claims the benefit under 35 U.S.C. § 119 of German Patent Application No. DE 102015213996.4 filed on Jul. 24, 2015, which is expressly incorporated herein by reference in its entirety.

FIELD

The present invention relates to a method and a device for determining a pickup position from multiple pickup positions for a vehicle incorporated by a parking facility, at which the vehicle is to be picked up after an automatic parking operation.

Moreover, the present invention relates to a parking facility for vehicles, and a computer program.

BACKGROUND INFORMATION

German Patent Application DE 10 2012 222 562 A1 describes a system for managed parking facilities for transferring a vehicle from a starting position to a target position.

In fully automated (autonomous) so-called valet parking, a vehicle is parked by its driver at a drop-off point, for example in front of a parking garage, and from there the vehicle drives itself into a parking position/parking bay and back to the drop-off point.

Parking facilities may have multiple exits, for example. In such a case, it may be provided, for example, that a pickup point or pickup position at which the vehicle is to be picked up by the driver after a fully automated valet parking operation has been carried out is associated with each of the exits.

In a parking facility which includes multiple exits, a traffic holdup in front of an exit may result in delays in leaving the parking facility when the driver leaves the parking facility via this exit because the driver has picked up his/her vehicle from the pickup position that is associated with this exit.

SUMMARY

An object underlying the present invention is regarded as efficiently determining a pickup position from multiple pickup positions for a vehicle incorporated by a parking facility, at which the vehicle is to be picked up after an automatic parking operation.

According to one aspect of the present invention, a method for determining a pickup position from multiple pickup positions for a vehicle incorporated by a parking facility, at which the vehicle is to be picked up after an automatic parking operation, is provided, including:
ascertaining a traffic situation inside and/or outside the parking facility and
determining the pickup position from the multiple pickup positions, based on the ascertained traffic situation, so that the automatic parking operation may end at the designated pickup position.

According to another aspect, a device for determining a pickup position from multiple pickup positions for a vehicle incorporated by a parking facility, at which the vehicle is to be picked up after an automatic parking operation, is provided, including:
an ascertainment device for ascertaining a traffic situation inside and/or outside the parking facility and
a determination device for determining the pickup position from the multiple pickup positions, based on the ascertained traffic situation, so that the automatic parking operation may end at the designated pickup position.

According to yet another aspect, a parking facility for vehicles is provided which includes:
multiple pickup positions at which a vehicle may be picked up after an automatic parking operation is carried out, and
the device for determining a pickup position.

According to another aspect, a computer program is provided which includes program code for carrying out the method for determining a pickup position when the computer program is executed on a computer.

The present invention thus includes in particular, and among other things, determining the pickup position for the vehicle based on the traffic situation inside and/or outside the parking facility. The traffic situation inside and/or outside the parking facility is thus taken into account in the selection of which pickup position the vehicle is to be picked up at after the automatic parking operation has ended. This results in particular in the technical advantage that the pickup position may be efficiently determined from the multiple pickup positions.

Within the scope of an automatic parking operation, it is provided that the vehicle is driven in a driverless manner from a drop-off position to the parking position and parked there in a driverless manner. The vehicle is parked there for a predetermined period of time, or until the user or a parking facility management system requests the vehicle. After the predetermined period of time elapses, or after an appropriate request, within the scope of an automatic parking operation it is provided that the vehicle is either driven in a driverless manner back to the same drop-off position, which then becomes a pickup position, or to some other position inside the parking facility at which the user may pick up his/her vehicle. Such a position is referred to as a pickup position.

This means that the drop-off position refers to a position at which the user parks his/her vehicle before the automatic parking operation begins. That is, a drop-off position refers to a position at which the automatic parking operation is to begin, and that after the vehicle is parked at the drop-off position, it is driven in a driverless manner from the drop-off position to the parking position.

This means that the pickup position refers to a position at which the user is to pick up his/her vehicle after the automatic parking operation has ended. That is, a pickup position refers to a position at which the automatic parking operation is to end, and that the vehicle is driven in a driverless manner from the parking position to the pickup position, and parked there so that the user may pick it up.

According to one specific embodiment, carrying out the automatic parking operation by the vehicle includes remote control of the vehicle. According to one specific embodiment, it is provided that carrying out the automatic parking operation includes travel of the vehicle at least partially autonomously, in particular completely autonomously. According to one specific embodiment, mixed forms of the two specific embodiments mentioned above are provided.

This means that the vehicle may autonomously travel one leg, for example. The vehicle is then driven another leg by remote control.

Within the meaning of the present invention, "autonomous" means in particular that the vehicle navigates or travels through the parking facility independently, i.e., without intervention by a driver. The vehicle thus travels independently through the parking facility, without a driver having to control the vehicle. Controlling or driving includes in particular transverse and/or longitudinal guidance.

A vehicle which may be driven autonomously and/or by remote control, i.e., generally in a driverless manner, inside or on a parking facility is referred to as an automated valet parking (AVP) vehicle, for example.

This means that within the scope of the automatic parking operation, the vehicle is driven in a driverless manner from the drop-off position to the parking position and parked there. After the end of a predetermined period, which may be referred to as a parking period, the vehicle is then driven in a driverless manner from the parking position back to the same drop-off position or to some other position, which is generally referred to as a pickup position.

In one specific embodiment, it is provided that the automatic parking operation is carried out. In particular, it is provided that after the vehicle is parked at the drop-off position, it is driven in a driverless manner to a parking position. In particular, it is provided that after the pickup position is determined, the vehicle is driven in a driverless manner from the parking position to the designated pickup position.

"In a driverless manner" means that a human driver does not have to be present in the vehicle in order for the vehicle to be driven.

The beginning of the automatic parking operation thus denotes the start of the driverless driving of the vehicle to the parking position. The end of the automatic parking operation denotes the point in time at which the vehicle has been parked at the pickup position after it has been driven in a driverless manner from the parking position to the pickup position.

According to one specific embodiment, the vehicle is a motor vehicle. The motor vehicle is a passenger vehicle or a truck, for example. The motor vehicle is a two-wheeled motor vehicle, for example, in particular a motorcycle.

The traffic situation refers in particular to a state which takes into account a vehicle density and/or traffic obstructions and/or a weather condition inside and/or outside the parking facility.

The state is an actual state, for example, since the traffic situation may then be referred to as an actual traffic situation or a momentary or instantaneous traffic situation.

The state is a predicted or projected state, for example, since the traffic situation may then be referred to as a predicted traffic situation or a projected traffic situation.

When a traffic situation is referred to in general terms, according to one specific embodiment this is intended to always include both states, the actual state and the projected state.

This means that according to one specific embodiment, the determination of the pickup position is carried out based on the actual state and/or the projected state, and/or based on both the actual state and the projected state.

Within the meaning of the present invention, a parking facility may also be referred to as a parking area, and is used as a parking lot for vehicles. The parking facility thus forms in particular a contiguous area which includes multiple parking spaces for a parking facility on private property, or multiple parking positions for a parking facility on public property.

According to one specific embodiment, the parking facility is designed as a parking deck. According to one specific embodiment, the parking facility is designed as a parking garage.

This means that locations or areas or positions at or on which the vehicle is to be parked are parking spaces on private property or on public property. For the sake of simplicity, the single term "parking position" is used for the terms "parking spaces on private property" and "parking spaces on public property."

According to one specific embodiment, it is provided that an area situated inside the parking facility is detected with the aid of an internal surroundings sensor system in order to ascertain internal surroundings data corresponding to the detected area, the traffic situation inside the parking facility being ascertained based on the ascertained internal surroundings data.

This results in particular in the technical advantage that the traffic situation inside the parking facility may be efficiently detected. Thus, for example, vehicles situated inside the parking facility or traveling inside the parking facility are detected with the aid of the internal surroundings sensor system. Thus, for example, a vehicle density in the area is ascertained with the aid of the internal surroundings sensor system. The area situated inside the parking facility includes the complete parking facility, for example. In particular, the area includes only a partial area of the parking facility. According to one specific embodiment, multiple such areas are provided which are appropriately detected with the aid of the internal surroundings sensor system.

According to another specific embodiment, it is provided that the traffic situation inside the parking facility is ascertained based on automatic parking operations which are being carried out inside the parking facility at that moment and/or which are to be carried out inside the parking facility in the future.

This results in particular in the technical advantage that the automatic parking operations which are carried out inside the parking facility at that moment and/or in the future are taken into account in determining the pickup position. This results in particular in the technical advantage that the pickup position may be efficiently determined. If, for example, one of the pickup positions is to be used in the future for another vehicle as the pickup position after the automatic parking operation, it is more meaningful to select a different pickup position, so that the vehicle and the other vehicle do not get in the way of one another, or that the vehicle does not have to wait for the other vehicle to free up the pickup position.

For example, a waiting time until a vehicle is able to park at the pickup position may thus be reduced.

According to one specific embodiment, it is provided that when the automatic parking operations are carried out for AVP vehicles, ascertained setpoint trajectories are used to ascertain the traffic situation.

Use of the automatic parking operations in ascertaining the traffic situation means in particular that information, i.e., knowledge, about the parking operations is used. Information includes, for example, positions of vehicles inside the parking facility, routes of vehicles inside the parking facility, and actual trajectories of vehicles inside the parking facility.

In another specific embodiment, it is provided that an area situated outside the parking facility and directly adjacent to an exit of the parking facility is detected with the aid of an external surroundings sensor system in order to ascertain external surroundings data corresponding to the detected area, the traffic situation outside the parking facility being ascertained based on the ascertained external surroundings data.

This results in particular in the technical advantage that a traffic situation in the immediate surroundings of an exit of the parking facility is taken into account in determining the pickup position. Thus, for example, vehicles situated outside the parking facility directly adjacent to the exit are detected with the aid of the external surroundings sensor system. For example, a vehicle density in the area of the exit is thus ascertained with the aid of the external surroundings sensor system. If, for example, it is ascertained that in these surroundings of the exit a vehicle density is present which is above a predetermined safety value, for example a pickup position is determined which is associated with a different exit. This means that, for example, a vehicle may be prevented from standing in a traffic holdup after leaving through the exit. The vehicle is thus advantageously driven in a driverless manner to a pickup position of another exit.

Within the meaning of the present invention, a surroundings sensor system, in particular an internal and/or an external surroundings sensor system, includes one or multiple surroundings sensors. A surroundings sensor is one of the following surroundings sensors, for example: ultrasonic sensor, laser sensor, LIDAR sensor, video sensor, magnetic sensor, or radar sensor.

Such sensors sense their respective surroundings and appropriately form or ascertain surroundings data corresponding to the detected surroundings. If surroundings are ascertained with the aid of the internal surroundings sensor system, the corresponding surroundings data are referred to as internal surroundings data. This similarly applies for the external surroundings sensor system, which correspondingly ascertains external surroundings data. In this regard, "internal" refers to one or multiple areas situated inside the parking facility. "External" refers in particular to areas situated externally, i.e., outside the parking facility.

According to one specific embodiment, "outside the parking facility" encompasses an area at a predetermined distance from the parking facility. For example, the predetermined distance is less than 10 km, for example less than 5 km, in particular less than 1 km. This means that, for example, only the traffic situation in this area is ascertained. For example, the level of effort in the ascertainment may be reduced in this way.

According to one specific embodiment, it is provided that appropriate traffic data corresponding to a traffic situation outside the parking facility are received via a communication network, the traffic situation outside the parking facility being ascertained based on the received traffic data.

This results in particular in the technical advantage that the traffic situation outside the parking facility may be efficiently ascertained. For example, such traffic data may be provided by a traffic server. Such a traffic server receives, for example, position data from mobile terminals of users of vehicles, so that, for example, a vehicle density outside the parking facility may thus be determined.

According to another specific embodiment, it is provided that the ascertained traffic situation includes a vehicle density in the particular surroundings of the multiple pickup positions, the pickup position at which the vehicle is to be picked up after the automatic parking operation having the lowest vehicle density in its particular surroundings, being determined as the pickup position.

This results in particular in the technical advantage that an obstruction by other vehicles of the vehicle which is to end the automatic parking operation, when it is parked at the designated pickup position, may be minimized.

This means that the corresponding vehicle densities for the particular surroundings are ascertained and compared to one another. The lowest vehicle density may then be similarly computed or ascertained.

The surroundings refer, for example, to an area up to a predetermined distance from the particular pickup position. The predetermined distance is 30 m, for example.

In another specific embodiment, it is provided that the designated pickup position is transmitted to a terminal of a user of the vehicle via a communication network, so that the user may pick up his/her vehicle at the designated pickup position, based on the received designated pickup position.

This results in particular in the technical advantage that the user may be efficiently informed of the designated pickup position.

According to one specific embodiment, it is provided that a route from an instantaneous position of the user to the designated pickup position is computed, the computed route being transmitted to the user's terminal via the communication network, so that the user may reach the designated pickup position from his/her instantaneous position, based on the computed route.

This results in particular in the technical advantage that the user may efficiently reach the designated pickup position from his/her instantaneous position.

The user is in particular a future driver of the vehicle. In particular, the user is a future occupant of the vehicle other than the driver.

According to another specific embodiment, it is provided that a target position of a destination to which the vehicle will be driven after the vehicle has been picked up from one of the pickup positions is received via a communication network, a route from the particular pickup position to the target position being ascertained for each of the pickup positions, for the ascertained routes in each case a further traffic situation on the particular route being ascertained, and the determination of the pickup position being carried out based on the ascertained further traffic situations.

This results in particular in the technical advantage that the pickup position may be efficiently determined. Thus, for example, it is provided that an ascertainment is made concerning on which of the routes the vehicle will reach the destination the fastest. The designated pickup position is then the pickup position with the fastest route. Alternatively, it is ascertained which of the routes is the shortest, so that the designated pickup position is then the pickup position with the shortest route.

According to one specific embodiment, it is provided that the device for determining a pickup position is designed or configured for executing or carrying out the method for determining a pickup position.

Specific embodiments concerning the device similarly result from corresponding specific embodiments concerning the method, and vice versa. This means that technical functionalities of the device similarly result from corresponding technical functionalities of the method, and vice versa.

This means that according to one specific embodiment, the ascertainment device is designed for ascertaining the traffic situation inside the parking facility, based on the ascertained internal surroundings data.

According to one specific embodiment, the ascertainment device is designed for ascertaining the traffic situation inside the parking facility, based on automatic parking operations which are being carried out inside the parking facility at that moment and/or which are to be carried out inside the parking facility in the future.

According to one specific embodiment, it is provided that the ascertainment device is designed for ascertaining the traffic situation outside the parking facility, based on the ascertained external surroundings data.

According to one specific embodiment, it is provided that the ascertainment device is designed for ascertaining the traffic situation outside the parking facility, based on the received traffic data.

According to one specific embodiment, it is provided that the ascertainment device is designed for ascertaining a vehicle density in the particular surroundings of the multiple pickup positions, so that the ascertained traffic situation includes a vehicle density in the particular surroundings of the multiple pickup positions, the ascertainment device being designed for determining that pickup position at which the vehicle is to be picked up after the automatic parking operation, having the lowest vehicle density in its particular surroundings, as the pickup position.

According to one specific embodiment, the device includes a communication interface for a communication via a communication network. This communication includes in particular reception of traffic data, transmitting the designated pickup position to a terminal of a user of the vehicle, and transmitting a route from an instantaneous position of the user to the designated pickup position.

According to one specific embodiment, the device includes an external and/or internal surroundings sensor system.

According to one specific embodiment, the ascertainment device is designed for computing a route from an instantaneous position of the user to the designated pickup position.

According to one specific embodiment, it is provided that the ascertainment device is designed for ascertaining for each of the pickup positions a route from the particular pickup position to a target position of a destination to which the vehicle will drive after it has been picked up from one of the pickup positions, the target position being received via a communication network, the ascertainment device being designed for ascertaining in each case for the ascertained routes a further traffic situation on the particular route, and the determination device being designed for ascertaining the pickup position based on the ascertained further traffic situations.

According to one specific embodiment, the communication network includes a WLAN network and/or a mobile communications network.

In one specific embodiment, it is provided that a communication via the communication network is or becomes encrypted.

According to one specific embodiment, the terminal is a mobile terminal, in particular a mobile telephone, in particular a smart phone.

The present invention is explained in greater detail below with reference to preferred exemplary embodiments.

DETAILED DESCRIPTION OF EXAMPLE EMBODIMENTS

Figure 1:
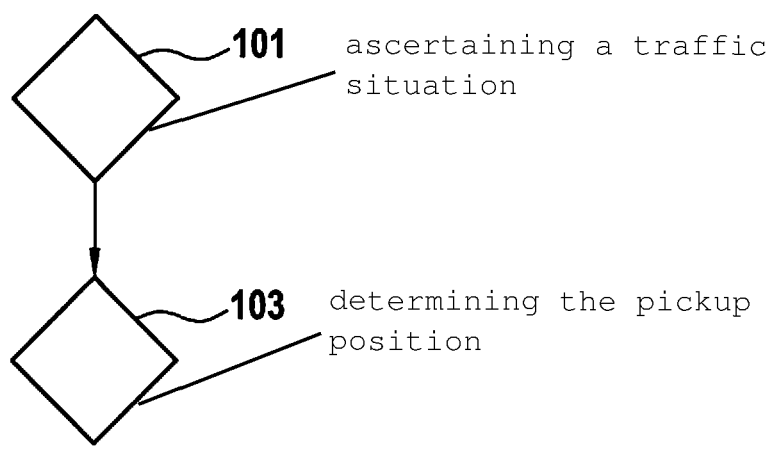
FIG. 1 shows a flow chart of a method for determining a pickup position.

FIG. 1 shows a flow chart of a method for determining a pickup position from multiple pickup positions for a vehicle incorporated by a parking facility, at which the vehicle is to be picked up after an automatic parking operation.

The method includes the following:
ascertaining 101 a traffic situation inside and/or outside the parking facility and
determining 103 the pickup position from the multiple pickup positions, based on the ascertained traffic situation, so that the automatic parking operation may end at the designated pickup position.

Figure 2:
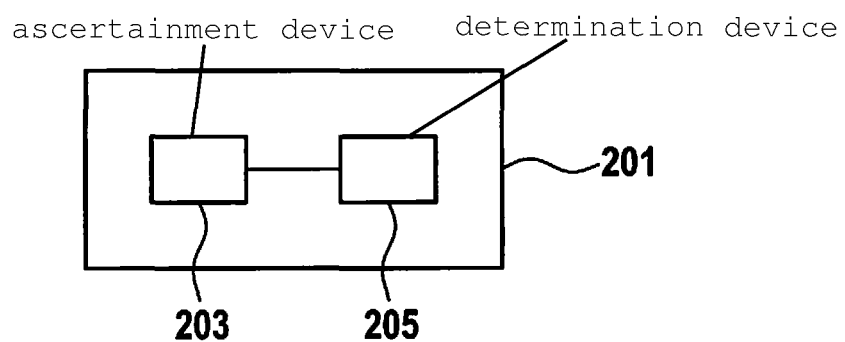
FIG. 2 shows a device for determining a pickup position.

FIG. 2 shows a device 201 for determining a pickup position from multiple pickup positions for a vehicle incorporated by a parking facility, at which the vehicle is to be picked up after an automatic parking operation.

The device 201 includes:
an ascertainment device 203 for ascertaining a traffic situation inside and/or outside the parking facility and
a determination device 205 for determining the pickup position from the multiple pickup positions, based on the ascertained traffic situation, so that the automatic parking operation may end at the designated pickup position.

In one specific embodiment not shown, device 201 includes a communication interface which is designed for communicating via a communication network.

Figure 3:
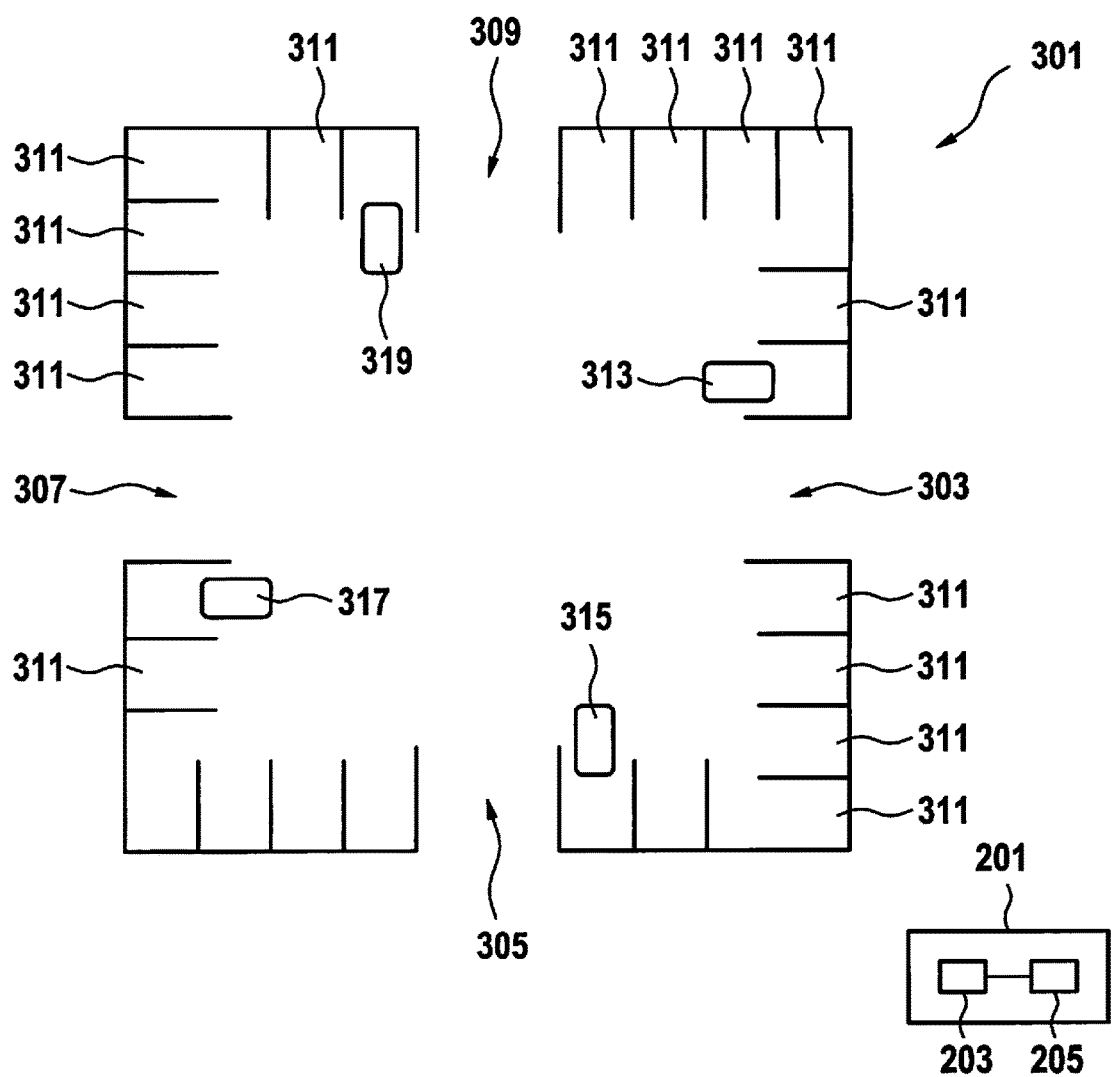
FIG. 3 shows a parking facility for vehicles.

FIG. 3 shows a parking facility 301 for vehicles.

Parking facility 301 includes multiple exits 303, 305, 307, 309 for exiting from parking facility 301. Multiple parking spaces or parking positions 311 are formed inside parking facility 301. A pickup position 313, 315, 317, 319 is associated with each of exits 303, 305, 307, 309, respectively. A vehicle is to be picked up by a user at one of these pickup positions 313, 315, 317, 319 after an automatic parking operation. Thus, an automatic parking operation is to end at one of these pickup positions 313, 315, 317, 319.

Parking facility 301 also includes parking facility server 201 according to FIG. 3.

For carrying out an automatic parking operation, a driver drives his/her vehicle into parking facility 301 through an entrance to the parking facility and parks his/her vehicle at a drop-off position.

The driver leaves his/her vehicle after parking at the drop-off position. The vehicle subsequently carries out an automatic parking operation and thus parks automatically at one of parking spaces 311. For example, parking facility server 201 drives the vehicle by remote control and guides it in a driverless manner to the parking position. For example, the parking facility server 201 transmits the parking position to the vehicle, so that the vehicle knows to which of the parking positions it is to autonomously travel in order to then autonomously travel to the parking position.

The determination of which of the four pickup positions 313, 315, 317, 319 the driver is to pick up his/her vehicle at is carried out based on a traffic situation inside and/or outside the parking facility.

After a parking period elapses, the vehicle is driven in a driverless manner back to the designated pickup position and parked there so that a user may pick up the vehicle.

The present invention thus includes in particular, and among other things, the idea of providing a technical solution which, for example, may minimize the time for a driver to pick up his/her vehicle after the automatic parking operation (taking the traffic situation inside the parking facility into account) and/or driving on (taking the traffic situation outside the parking facility into account).

The parking facility management system includes, for example, the device for determining a pickup position. Such a parking facility management system coordinates and/or controls the operation of the parking facility. In particular, the parking facility management system controls the automatic parking operations.

In accordance with the present invention, the parking facility includes multiple pickup positions. According to one specific embodiment, the pickup position at which a vehicle is actually to be picked up in order to subsequently leave the parking facility is dynamically selected based on the traffic situation inside and/or outside the parking facility. The initiator for this selection is thus in particular the parking facility management system.

According to one specific embodiment, the driver is informed of the designated, i.e., selected, pickup position and, for example, the path, i.e., the route, to that location. This takes place, for example, with the aid of the driver's smart phone, in general the driver's mobile terminal, in particular also with the aid of appropriate information provided in the parking facility.

In another specific embodiment, it is provided that the driver informs the parking facility management system in advance of where the vehicle is to travel after being picked up. In this way, the traffic situation on the route may also be advantageously integrated into the selection of the optimal pickup position.

According to one specific embodiment, the parking facility management system is aware of the traffic situation inside the parking facility, e.g., within the parking garage, for example, based on its tasks (carrying out the automatic parking operations) and its infrastructure (for example, with the aid of the internal surroundings sensor system, which may include cameras, for example).

According to one specific embodiment, the traffic situation outside the parking facility, for example outside the parking garage, is ascertained by the parking facility management system, using one or several of the following options:

Data (traffic data) are ascertained and/or retrieved from traffic situations and/or from traffic congestion services (Google Maps, for example). This means that such traffic data are received by the parking facility management system via a communication network.

A particular traffic situation is ascertained directly by the parking facility management system in front of the exits and/or in front of the entrances. This is carried out, for example, with the aid of an external surroundings sensor system, which may include outdoor cameras, for example.

Advantages according to the present invention are regarded in particular to be a shorter duration of a pickup operation. In particular, the advantages according to the present invention are regarded to be a shorter duration and less complexity for leaving the parking facility.

What is claimed is:

1. A method for determining a pickup position from multiple pickup positions for a vehicle incorporated by a parking facility, at which the vehicle is to be picked up after an automatic parking operation, the method including:
   ascertaining, via a parking facility management system, a traffic situation at least one of inside and outside the parking facility; and
   determining, via the parking facility management system, the pickup position from the multiple pickup positions, based on the ascertained traffic situation, so that the vehicle is driven autonomously and/or by remote control to the designated pickup position,
   wherein the traffic situation is a state which takes into account a vehicle density and/or a traffic obstruction and/or a weather condition inside and/or outside the parking facility,
   wherein the parking facility management system is configured to at least one of coordinate or control the automatic parking operation.

2. The method as recited in claim 1, further comprising:
   detecting an area situated inside the parking facility with the aid of an internal surroundings sensor system to ascertain internal surroundings data corresponding to the detected area, the traffic situation inside the parking facility being ascertained based on the ascertained internal surroundings data.

3. The method as recited in claim 1, wherein the traffic situation inside the parking facility is ascertained based on automatic parking operations which are being carried out inside the parking facility at least one of:
   at that moment, and which are to be carried out inside the parking facility in the future.

4. The method as recited in claim 1, wherein the determined pickup position is transmitted to a terminal of a user of the vehicle via a communication network, so that the user may pick up the vehicle at the designated pickup position, based on the received determined pickup position.

5. A method for determining a pickup position from multiple pickup positions for a vehicle incorporated by a parking facility, at which the vehicle is to be picked up after an automatic parking operation, the method including:
   ascertaining, via a parking facility management system, a traffic situation at least one of inside and outside the parking facility;
   determining, via the parking facility management system, the pickup position from the multiple pickup positions, based on the ascertained traffic situation, so that the vehicle is driven autonomously and/or by remote control to the designated pickup position; and
   detecting an area situated outside the parking facility and directly adjacent to an exit of the parking facility with the aid of an external surroundings sensor system to ascertain external surroundings data corresponding to the detected area, the traffic situation outside the parking facility being ascertained based on the ascertained external surroundings data
   wherein the parking facility management system is configured to at least one of coordinate or control the automatic parking operation.

6. A method for determining a pickup position from multiple pickup positions for a vehicle incorporated by a parking facility, at which the vehicle is to be picked up after an automatic parking operation, the method including:
   ascertaining, via a parking facility management system, a traffic situation at least one of inside and outside the parking facility; and
   determining, via a parking facility management system, the pickup position from the multiple pickup positions, based on the ascertained traffic situation, so that the vehicle is driven autonomously and/or by remote control to the designated pickup position;
   wherein traffic data corresponding to a traffic situation outside the parking facility are received via a communication network, the traffic situation outside the parking facility being ascertained based on the received traffic data, wherein the parking facility management system is configured to at least one of coordinate or control the automatic parking operation.

7. A method for determining a pickup position from multiple pickup positions for a vehicle incorporated by a parking facility, at which the vehicle is to be picked up after an automatic parking operation, the method including:

ascertaining, via a parking facility management system, a traffic situation at least one of inside and outside the parking facility; and determining, via a parking facility management system, the pickup position from the multiple pickup positions, based on the ascertained traffic situation, so that the vehicle is driven autonomously and/or by remote control to the designated pickup position;

wherein the ascertained traffic situation includes a vehicle density in surroundings of the multiple pickup positions, the one pickup position at which the vehicle is to be picked up after the automatic parking operation, having a lowest vehicle density in the surroundings, being determined as the pickup position, wherein the parking facility management system is configured to at least one of coordinate or control the automatic parking operation.

8. A method for determining a pickup position from multiple pickup positions for a vehicle incorporated by a parking facility, at which the vehicle is to be picked up after an automatic parking operation, the method including:

ascertaining, via a parking facility management system, a traffic situation at least one of inside and outside the parking facility; and determining, via a parking facility management system, the pickup position from the multiple pickup positions, based on the ascertained traffic situation, so that the vehicle is driven autonomously and/or by remote control to the designated pickup position;

wherein the determined pickup position is transmitted to a terminal of a user of the vehicle via a communication network, so that the user may pick up the vehicle at the designated pickup position, based on the received determined pickup position, wherein a route from an instantaneous position of the user to the determined pickup position is computed, the computed route being transmitted to the terminal of the user via the communication network, so that the user may reach the designated pickup position from an instantaneous position of the user, based on the computed route, wherein the parking facility management system is configured to at least one of coordinate or control the automatic parking operation.

9. A method for determining a pickup position from multiple pickup positions for a vehicle incorporated by a parking facility, at which the vehicle is to be picked up after an automatic parking operation, the method including:

ascertaining, via a parking facility management system, a traffic situation at least one of inside and outside the parking facility; and determining, via a parking facility management system, the pickup position from the multiple pickup positions, based on the ascertained traffic situation, so that the vehicle is driven autonomously and/or by remote control to the designated pickup position;

wherein a target position of a destination to which the vehicle will drive after the vehicle has been picked up from one of the pickup positions is received via a communication network, one route from the determined pickup position to the target position being ascertained for each of the pickup positions, for the ascertained routes in each case a further traffic situation on the particular route being ascertained, and the determination of the pickup position being carried out based on the ascertained further traffic situations, wherein the parking facility management system is configured to at least one of coordinate or control the automatic parking operation.

10. A device for determining a pickup position from multiple pickup positions for a vehicle incorporated by a parking facility, at which the vehicle is to be picked up after an automatic parking operation, comprising:

an ascertainment device configured to ascertain a traffic situation at least one of inside and outside the parking facility; and a determination device configured to determine the pickup position from the multiple pickup positions, based on the ascertained traffic situation, so that the vehicle is driven autonomously and/or by remote control to the designated pickup position.

11. A parking facility for vehicles, comprising:

multiple pickup positions at which a vehicle may be picked up after an automatic parking operation is carried out; and a device configured for determining a pickup position from the multiple pickup positions, including:

an ascertainment device configured to ascertain a traffic situation at least one of inside and outside the parking facility, and a determination device configured to determine the pickup position from the multiple pickup positions, based on the ascertained traffic situation, so that the vehicle is driven autonomously and/or by remote control to the designated pickup position.

12. A non-transitory computer readable storage medium storing computer code for determining a pickup position from multiple pickup positions for a vehicle incorporated by a parking facility, at which the vehicle is to be picked up after an automatic parking operation, the computer code, when executed with a computer, causing the computer to perform:

ascertaining a traffic situation at least one of inside and outside the parking facility; and determining the pickup position from the multiple pickup positions, based on the ascertained traffic situation, so that the vehicle is driven autonomously and/or by remote control to the designated pickup position.

* * * * *